United States Patent [19]

Kobayashi et al.

[11] Patent Number: 4,774,688
[45] Date of Patent: Sep. 27, 1988

[54] DATA PROCESSING SYSTEM FOR DETERMINING MIN/MAX IN A SINGLE OPERATION CYCLE AS A RESULT OF A SINGLE INSTRUCTION

[75] Inventors: Makoto Kobayashi, Kawasaki; Akihiro Kuroda, Tokyo; Takeshi Matsushita, Yamato, all of Japan

[73] Assignee: International Business Machines Corporation, Armonk, N.Y.

[21] Appl. No.: 786,997

[22] Filed: Oct. 15, 1985

[51] Int. Cl.[4] .............................................. G06F 9/00
[52] U.S. Cl. .............................. 364/900; 364/715.06
[58] Field of Search ... 364/200 MS File, 900 MS File, 364/513.5, 748, 715

[56] References Cited

U.S. PATENT DOCUMENTS

| | | | |
|---|---|---|---|
| 4,183,087 | 1/1980 | Huelsman | 364/715 |
| 4,308,589 | 12/1981 | Joyce et al. | 364/748 |
| 4,467,444 | 8/1984 | Harmon et al. | 364/900 |
| 4,539,549 | 9/1985 | Hong | 364/715 |
| 4,597,053 | 6/1986 | Chamberlin | 364/715 |

OTHER PUBLICATIONS

"ALU Implements Native Minimum/Maximum Function for Signal Processing Applications", IBM Tech. Disclosure Bulletin, vol. 29, No. 5, 10/86, pp. 1975-1978.
*IBM Technical Disclosure Bulletin*, vol. 22, No. 7, Dec. 1979, pp. 2671-2672, Parallel-Search Max/Min Word Algorithm.

*Primary Examiner*—Raulfe B. Zache
*Assistant Examiner*—A. Mohamed
*Attorney, Agent, or Firm*—Roy R. Schlemmer

[57] ABSTRACT

A data processing system is provided which includes ALU data busses, temporary operand storage registers, an accumulator, and a set of latches for temporarily storing data to be supplied to the input of the ALU. Output multiplexer is provided which can select the output of one of the latches or that of the ALU which is sent to the accumulator. A detector is also provided for determining whether the smaller or larger one of two data elements is stored in said latches according to the status of the ALU and a new MIN/MAX instruction and the selected data element is returned to a predetermined temporary storage register via the output multiplexer. A controller operates in cooperation with the system instruction decoder to effect this operation with a single machine instruction. In determining the minimum or maximum of N data elements, it is only necessary to execute the MIN or MAX operations $N-1$ times, whereby the maximum or the minimum can be easily determined, the length of the program shortened, and the execution time reduced.

2 Claims, 5 Drawing Sheets

DATA PROCESSING SYSTEM FOR DETERMINING MIN/MAX IN A SINGLE OPERATION CYCLE AS A RESULT OF A SINGLE INSTRUCTION

BACKGROUND OF THE INVENTION

The present invention relates to a data processing apparatus, and more particularly to one that can effectively compute minimum and maximum values.

DESCRIPTION OF THE PRIOR ART

In a conventional data processing apparatus much time is required to determine a minimum or maximum value, and a program with many steps is also often required for such application. This is best explained with an example.

The following recurrence formula is frequently executed in the dynamic programming matching technique that is employed in speech recognition or the like.

$$G(I, J) = \text{MIN} \begin{vmatrix} G(I-1, J) \\ G(I-1, J-1) \\ G(I-1, J-2) \end{vmatrix} + D(I, J)$$

wherein, G is accumulated distance, and D is local distance. As clearly seen from the formula, the new accumulated distance G (I, J) is obtained by selection of the minimum one from a predetermined range (J, J - 1 and J - 2) of a previously accumulated distance (I - 1), and by adding it to the local distance. Refer, for example, to the article by Fumitada Itakura, entitled "Minimum Prediction Residual Principle Applied to Speech Recognition," IEEE Transaction on Acoustic, Speech and Signal Processing, Vol. ASSP—23 (Feb. 1975) for a detailed description of dynamic programming matching.

The procedure for executing the operation of the above recurrence formula is, for example, as shown in the flow charts of FIG. 5 or FIG. 6. In these figures, Ri represents a register or its contents. It is assumed that $R_1$, $R_2$ and $R_3$ store G (I - 1, J), G (I - 1, J - 1) and G (I - 1, J - 2), respectively, while $R_4$ stores D (I, J). The procedures specified in FIGS. 5 and 6 are expressed by the S/370 assembly language program segments shown in Tables 1 and 2, respectively, both of which require a large number of steps which must be executed and a significant amount of time for execution.

TABLE 1

| Assembler of S/370 (1) |
|---|
| ... |
| ... |
| L0  CR R1, R2 |
|     BH L1 |
|     CR R1, R3 |
|     BH L2 |
|     AR R4, R1 |
|     B L3 |
| L1  CR R2, R3 |
|     BH L2 |
|     AR R4, R2 |
|     B L3 |
| L2  AR R4, R3 |
| L3  ... |
| ... |

TABLE 2

| Assembler of S/370 (2) |
|---|
| ... |
| ... |
| L0  CR R1, R2 |
|     BL L1 |
|     LR R1, R2 |
| L1  CR R1, R3 |
|     BL L2 |
|     LR R1, R3 |
| L2  AR R4, R1 |
| ... |
| ... |

In the above Tables 1 and 2, CR means 'comparison of contents of registers,' BH and BL mean 'conditional branches' (branching according to H or L), AR means 'addition of the content of registers,' B means 'unconditional branch,' and LR means 'transfer the content of registers.'

SUMMARY OF THE INVENTION

The present invention has for its primary object the taking of prior art MIN/MAX solution methods into consideration, and providing a data processing apparatus that can much more efficiently execute the determination of minimum and maximum values from a group of N data elements.

To achieve the above object, the data processing apparatus according to the invention comprises an ALU (arithmetic and logic unit), first and second registers that supply operands to first and second inputs of the ALU, respectively, a multiplexer that receives an operand from each of said first and second registers and the output of said ALU, and an instruction decoder that decodes various instructions and causes said ALU to execute a corresponding function. The instruction decoder controls switching of the multiplexer according to the instruction and the operating status of the ALU.

DESCRIPTION OF THE DISCLOSED EMBODIMENT

The disclosed embodiment of the invention is best described by referring to the attached drawings.

Figure 1:
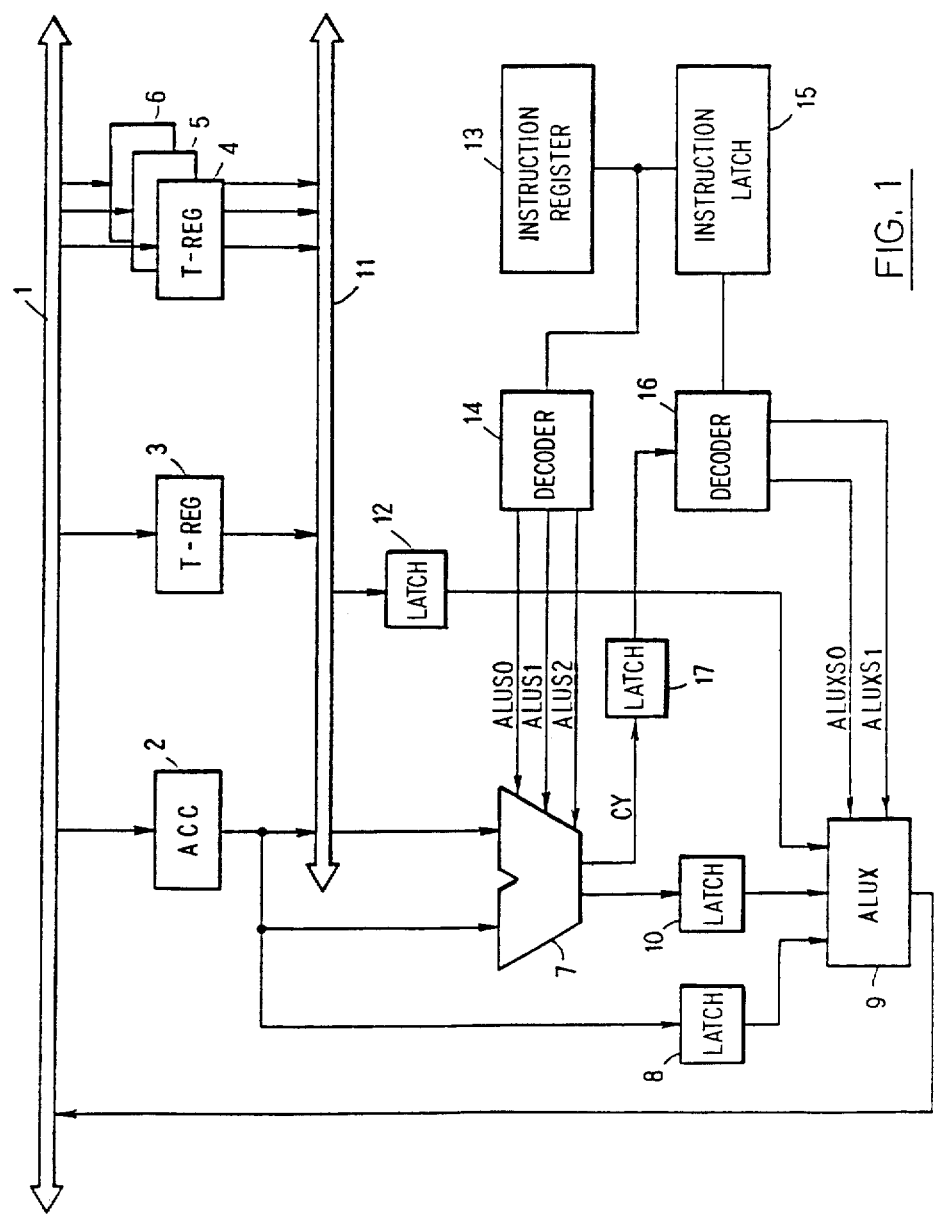
FIG. 1 is a block diagram schematically illustrating an embodiment of the invention.

FIG. 1 illustrates the embodiment schematically, wherein first data bus 1 is connected with the input of an accumulator 2 and each of temporary registers 3–6. The output of the accumulator 2 is connected to the input of an ALU 7, and to the first input of a multiplexer 9 through an accumulator latch 8. The output of the ALU 7 is connected to the second input of the multiplexer 9 through an ALU latch 10.

Second data bus 11 is connected to the output of the accumulator 2 and each of the temporary registers 3–6. It is also connected to the second input of the ALU 7, and to the third input of the multiplexer 9 through a data bus latch 12.

The output of an instruction register 13 is connected to the input of a first decoder circuit 14, and to the input of a second decoder circuit 16 through an instruction latch 15. The first decoder circuit 14 is shown in detail in FIG. 3 for sending control signals ALUS0–ALUS2 to the ALU 7, while the second decoder circuit 16 is for sending control signals ALUXS0 and ALUXS1 to the multiplexer 9. In addition, carry CY is supplied from ALU 7 to the second decoder circuit 16 through a latch 17. Other circuits for decoding instructions are not shown as they are clearly within the purview of those skilled in the art.

Figure 2:
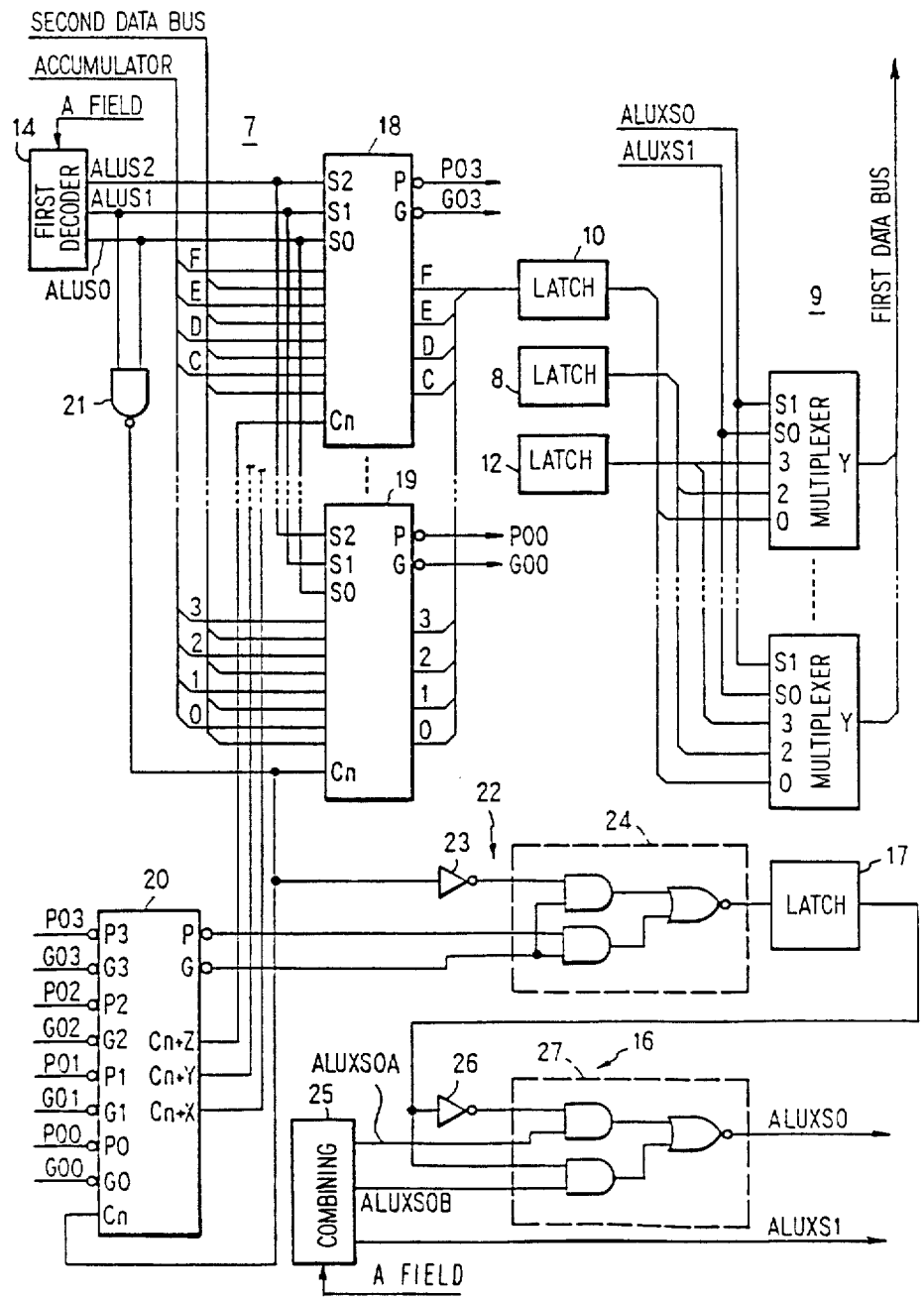
FIG. 2 is a block diagram illustrating details of major portions of the embodiment in FIG. 1.

FIG. 2 shows details of major portions of the embodiment in FIG. 1, wherein the ALU 7 is illustrated as one for executing arithmetic and logical operation of 16 bits. In detail, the ALU 7 consists of four cascade-connected 4-bit ALU circuits 18, 19 ... (the remaining two are not shown), a look ahead carry generator 20 and the like. An SN74S381 processor chip made by Texas Instrument Company may be used for the ALU circuits 18 and 19, et seq. while part no. SN74S182 made by the same company may be used as the carry generator 20. The principal operations of the ALU 7 are as follows:

SUB: subtracts content of the second data bus from the content of the accumulator 2.
ADD: adds content of the accumulator 2 and content of the second data bus.
AND: obtains logical product of content of the accumulator 2 and content of the second data bus.
IOR: obtains logical sum of content of the accumulator 2 and content of the second data bus.
EOR: obtains exclusive OR of content of the accumulator 2 and content of the second data bus.

The relevant instructions to the present invention will now be described. An instruction has the format shown below, and its type is arranged to be specified by its two high level bits. Here, the description is made only of those instructions relating to the ALU specified by the upper two bits "00".

| 0 0 | M | C | A | D | S |
|---|---|---|---|---|---|
| F E | D C | B A | 9 8 7 6 | 5 4 3 | 2 1 0 |

In the above format, the M field is for control of write-/read operation of the memory, and the C field is for miscellaneous control. The A field is for determining the type of operation. The S field is for specifying a register to be read to the second data bus, from those that can be the source of the operation, while the D field specifies a register into which the result of an operation is written. Although it is possible to specify an accumulator with the S field, and a temporary register with the D field, for the sake of simplicity, the following description is limited to the case where the accumulator and a temporary register are made the two source operands and the result of operation is written into the accumulator.

Figure 3:
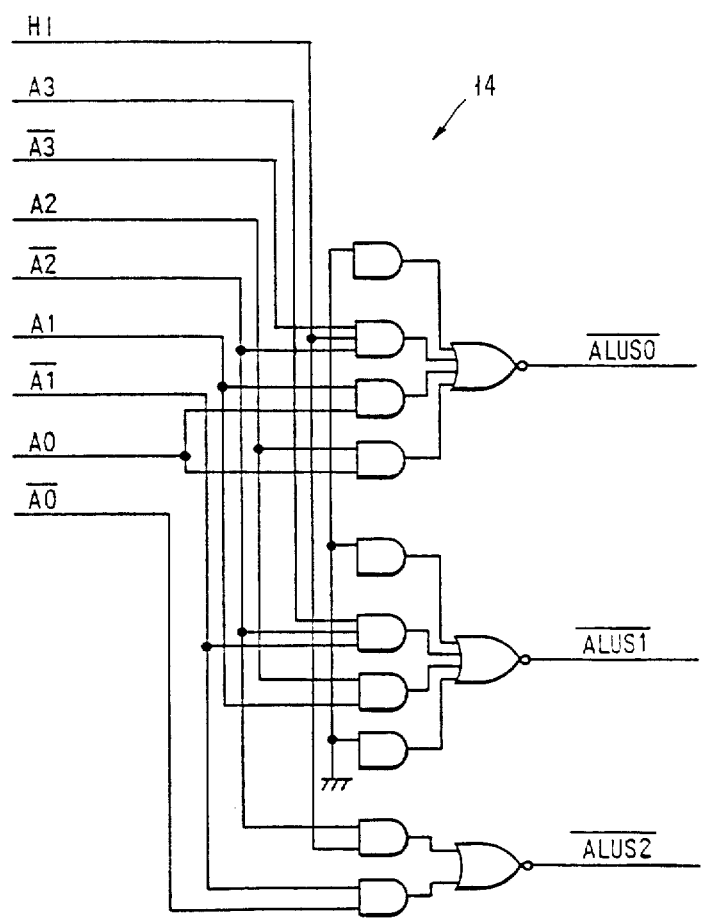
FIGS. 3 and 4 are block diagrams illustrating details of the circuit in FIG. 2, respectively.

Referring now to FIG. 2, the first decoder circuit 14 receives the A field of such an instruction and performs the decoding function as shown in Table 3 to cause the ALU 7 to execute a predetermined operation. This decoding is performed, for example, by a combination circuit as shown in FIG. 3. In the figure, the bits in the A field are specified by attaching suffix to A. HI is a signal fixed to high level. However, this decoding is for the case where said SN74S381 is used as the ALU circuit 18 and 19. No specific description of how the ALU circuits 18 and 19 function internally according to the decoded output of the first decoding circuit 14, or the control signals ALUS0–ALUS2 of the ALU 7 as this is considered clearly within the purview of those skilled in the art.

TABLE 3

| Instruction | A field | $ALUS_0, S_1, S_2$ | Action of ALU |
|---|---|---|---|
| MIN | 0001 | 0, 1, 0 | SUB |
| MAX | 0010 | 0, 1, 0 | SUB |
| SUB | 0011 | 0, 1, 0 | SUB |
| ADD | 0100 | 0, 1, 1 | ADD |
| AND | 0101 | 1, 1, 0 | AND |
| IOR | 0110 | 1, 0, 1 | IOR |
| EOR | 0111 | 1, 0, 0 | EOR |

The ALU control signals ALUS0 and ALUS1 are supplied to the input of a NAND circuit 21. The output of the NAND circuit 21, and the carry propagation output P and carry generation output G of the carry generator 18 are supplied to the combinatorial circuit 22. The circuit 22 consists of an inverter 23 and an AND-OR invert circuit 24. When the ALU 7 sustracts the content of the second data bus from the content of the accumulator 2, or the instructions are MIN, MAX or SUB (when the ALU control signals ALUS0–ALUS2 are "010"), the combination circuit 22 generates an output of "1" if the former is larger than the latter, and otherwise it generates an output of "0". The output of the combinatorial circuit 22 is supplied to and temporarily stored in the latch 17 as carry CY indicating the status of the result of the operation of the ALU 7 before it is supplied to the second decoding circuit 16.

The second decoding circuit 16 consists of a combinatorial circuit 25, an inverter 26 and an AND-OR invert circuit 27. The combinatorial circuit 25 is one as shown in FIG. 4, in which the input or the A field of the instruction has the relation to the outputs ALUXS1, ALUXS0A and ALUXS0B as shown in Table 4.

Figure 4:
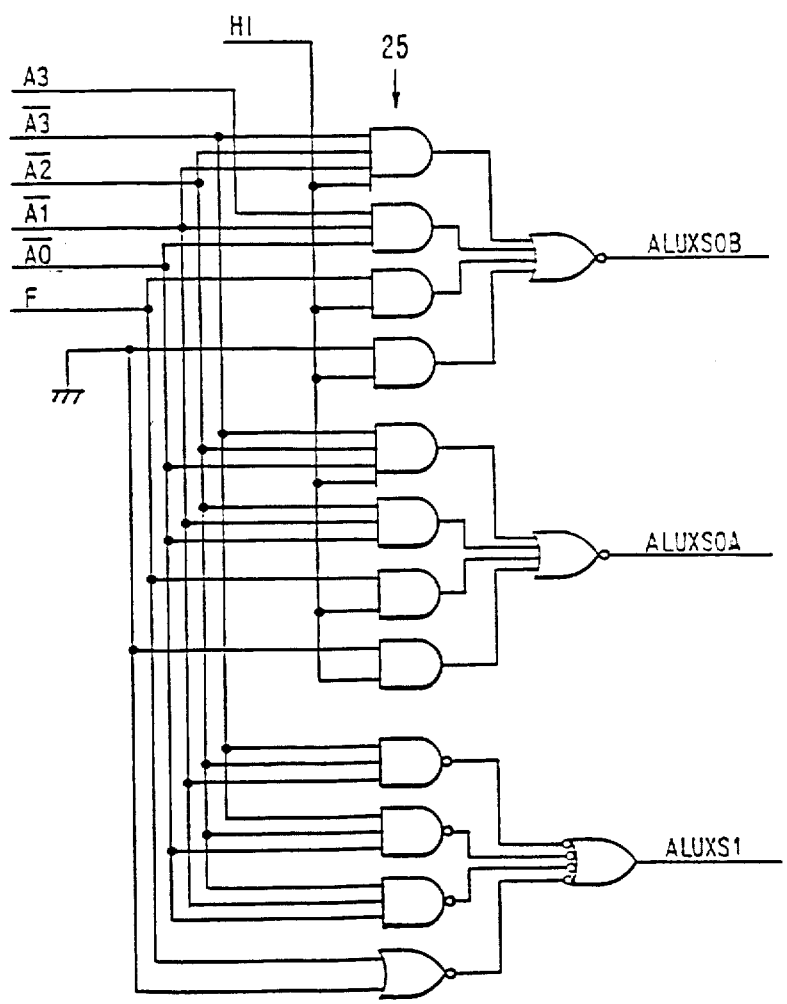
Figure 5:
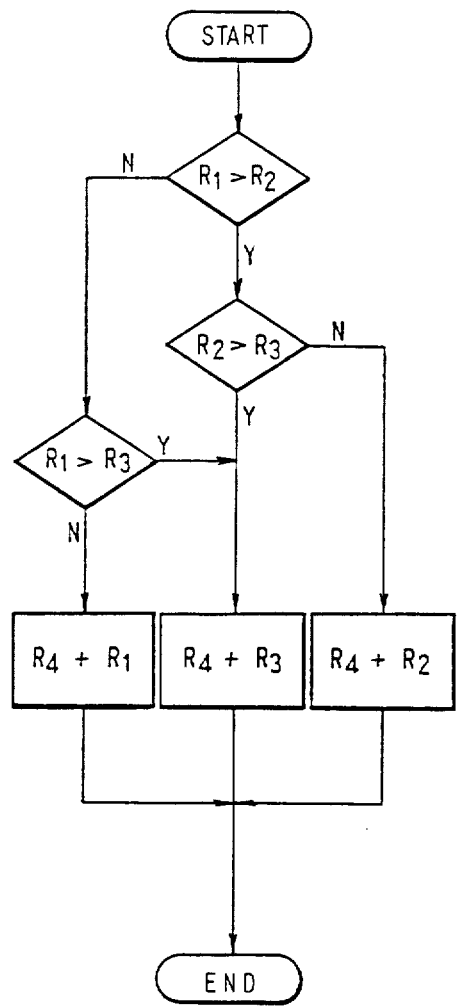
FIGS. 5 and 6 are flowcharts for explaining the background of the invention.
Figure 6:
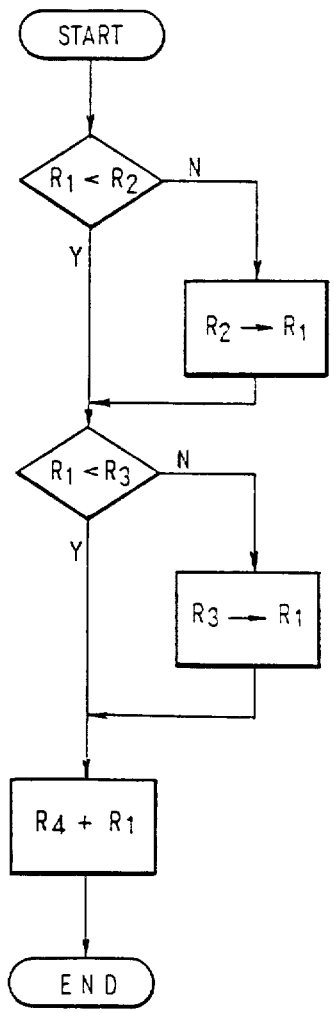

Also, in FIG. 4, bits on the A field are specified by attaching a suffix to A. HI is a signal fixed at high level as in FIG. 3. F is the bit for the maximum value (MAX) instruction.

TABLE 4

| Instruction | A field | ALUXS1, 0A, 0B |
|---|---|---|
| MIN | 0001 | 1, 1, 0 |
| MAX | 0010 | 1, 0, 1 |
| SUB | 0011 | 0, 1, 1 |
| ADD | 0100 | 0, 1, 1 |
| AND | 0101 | 0, 1, 1 |
| IOR | 0110 | 0, 1, 1 |
| EOR | 0111 | 0, 1, 1 |

The output ALUSX0 of the combinatorial circuit consisting of the inverter 26 and the AND-OR invert circuit 27 shows the following changes according to its inputs ALUXS0A and ALUXS0B and the carry CY as shown in Table 5.

TABLE 5

| ALUXS0A | ALUXS0B | ALUXS0 |
|---|---|---|
| 0 | 0 | 1 |
| 1 | 0 | CY |
| 0 | 1 | CY |
| 1 | 1 | 0 |

As seen from Tables 4 and 5, ALUXS0 varies according to the carry CY if the instruction is MIN and MAX, and is determined independently from the carry CY for other instructions. The relationship between the A field of the instruction, and the multiplexer control signals ALUXS0 and ALUXS1 may be summarized as follows:

TABLE 6

| Instruction | A field | CY | ALUXS0, S1 |
|---|---|---|---|
| MIN | 0001 | 1 | 0, 1 |
|  |  | 1 | 1, 1 |
| MAX | 0010 | 0 | 1, 1 |
|  |  | 1 | 0, 1 |
| SUB | 0011 | — | 0, 0 |
| ADD | 0100 | — | 0, 0 |
| AND | 0101 | — | 0, 0 |
| IOR | 0110 | — | 0, 0 |
| EOR | 0111 | — | 0, 0 |

The above-mentioned multiplexer control signals ALUXS0 and ALUXS1 are supplied to the multiplexer 9. The multiplexer 9 may be constructed by, for example, eight part no. SN74S153's of the Texas Instruction Company. In the configuration shown in FIG. 2, the next input is outputted according to the control signals ALUXS0 and ALUXS1, and supplied to the first data bus 1.

TABLE 7

| ALUXS0 | ALUXS1 | Output |
|---|---|---|
| 0 | 0 | ALU latch 10 |
| 0 | 1 | Accumulator latch 8 |
| 1 | 1 | Data bus latch 12 |

The above are summarized as in the following table:

TABLE 8

| Instruction | CY | Output |
|---|---|---|
| MIN | 1/0 | Data bus latch 12/ accumulator latch 8 |
| MAX | 1/0 | Accumulator latch 8/ data bus latch 12 |
| SUB | — | ALU latch 10 |
| ADD | — | ALU latch 10 |
| AND | — | ALU latch 10 |
| IOR | — | ALU latch 10 |
| EOR | — | ALU latch 10 |

As seen from the above table, if the instruction is SUB, ADD, AND, IOR or EOR, output of ALU 7 is supplied to the first data bus 1, and then stored in the accumulator 2. On the other hand, if the instruction is MIN, the multiplexer is switched according to the value of the carry (CY) output of the ALU 7. That is, when the content of the accumulator is larger than that of the specified temporary register, or the carry CY is 1, data in the data bus latch 12 or the content of the second data bus 11 is sent to the data bus 1 through the multiplexer 9, and stored in the accumulator 2. When the content of the accumulator is smaller than that of the specified temporary register the carry CY becomes "0", and data in the accumulator latch 8 or the content of the accumulator 2 is again stored in the accumulator 2 through the multiplexer 9 and the data bus 1. This means that the smaller data is stored in the accumulator 2.

Conversely, when the instruction is MAX, the multiplexer is switched according to the carry CY of the ALU 7. In this case, the larger data is stored in the accumulator 2 as will be readily understood.

In the case of major instructions other than MAX and MIN, normal operation is performed because the content of the ALU 7 or the result of operation is sent to the first data bus 1 through the multiplexer 9, as shown in Table 8.

In such a configuration, a program that executes the above-mentioned recurrence formula:

$$G(I, J) = \text{MIN} \begin{vmatrix} G(I-1, J) \\ G(I-1, J-1) \\ G(I-1, J-2) \end{vmatrix} + D(I, J)$$

becomes as follows:

MIN R1, R2
MIN R1, R3
AR R4, R1

As seen from the above description of the embodiment, the minimum value can be easily determined by using the instruction MIN. That is, the program length can be substantially shortened and the execution time can be also reduced because there is no need to use a conditional branch instruction. Of course, the maximum value can be easily determined by using the instruction MAX in place of the instruction MIN.

We claim:

1. In a data processing system including; an ALU, a plurality of temporary storage registers, and accumulator register and buss means connected to the inputs and outputs of said temporary registers and said accumulator, gating means for delivering two operands to first and second inputs of said ALU respectively, and an instruction decoder which decodes different instructions and controls the operation of said ALU, the improvement which comprises;

an output multiplexer which has as two inputs said outputs from said temporary registers, and said accumulator and, as a third input, an output from said ALU; and means actuated by the instruction decoder's decoding of a MIN/MAX instruction for enabling a MIN/Max detection means for determining which of said two operands satisfies said MIN/MAX (Smaller/Larger) instruction and means for actuating the output multiplexer for gating the smaller/larger operand directly through said output multiplexer to said accumulator in one instruction cycle as the result of a single instruction, said means for gating including latch means in the three inputs to said output multiplexer and in a carry output from the CPU being actuated intermediate of said one instruction cycle.

2. In a data processing system including;

an ALU, a plurality of temporary storage registers, buss means connected to the inputs and outputs of said storage registers and gating means for delivering operands to first and second inputs of said ALU from said registers, respectively, and an instruction decoder which decodes different instruction and controls said ALU to perform corresponding operations, the improvement which comprises;

an output multiplexer which has as two inputs said outputs from said temporary registers, and including selection means for connecting one of said inputs to its output, control means actuated by said instruction decoder and a carry output of said ALU for controlling the selection means for said multiplexer to gate one of the operands from one of said temporary storage registers in response to a predetermined instruction and the state of the carry output of said ALU and return same to a predetermined one of said temporary storage registers, said predetermined temporary storage register comprising an accumulator register for said ALU, said control means further operating in response to a MIN/MAX instruction to cause a smaller/larger operand to be gated through the output multiplexer to said accumulator, detection means for determining from the output of said ALU which of the input operands is smaller/larger in response to a MIN/MAX instruction, said output multiplexer having a third input comprising an arithmetic/logical output of said ALU and said control means including means for gating the output of said ALU to said accumulator register when it is determined that the arithmetic/logic instruction other than a MIN/MAX instruction is being executed by the ALU.

* * * * *